Patented Oct. 8, 1935

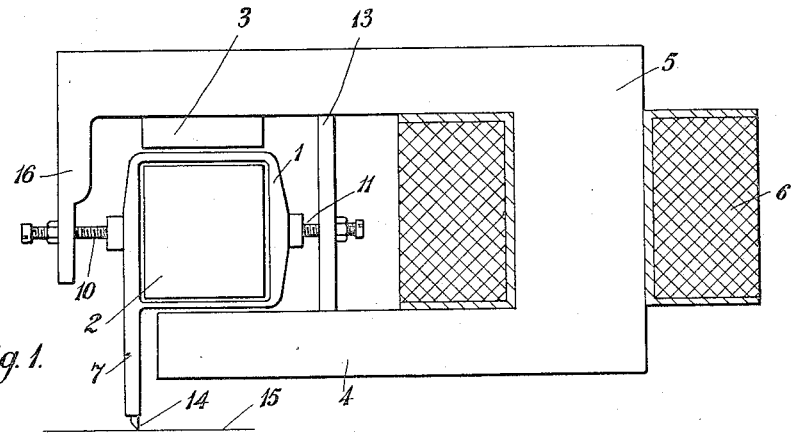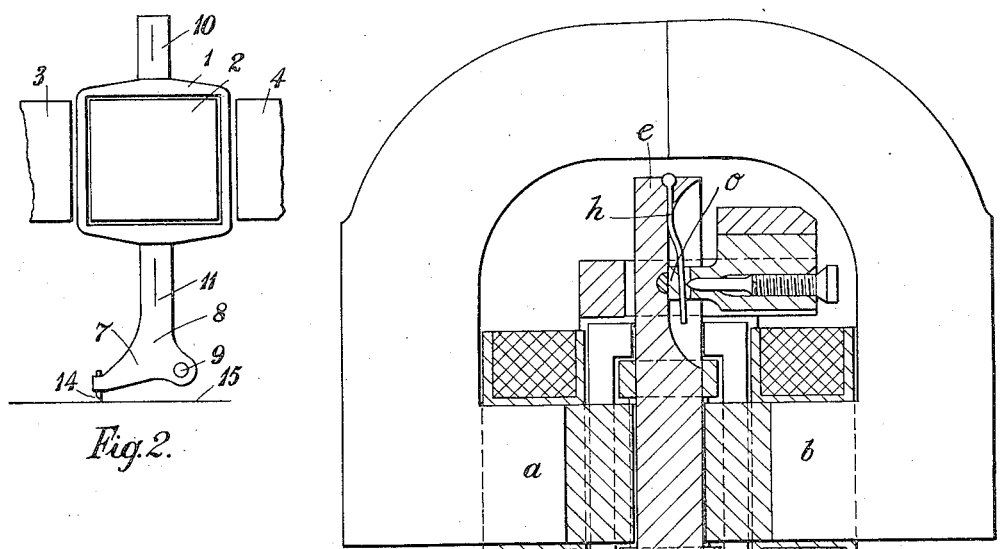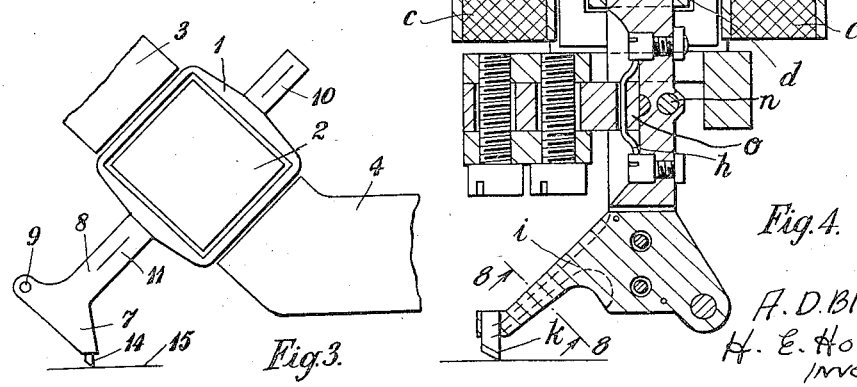

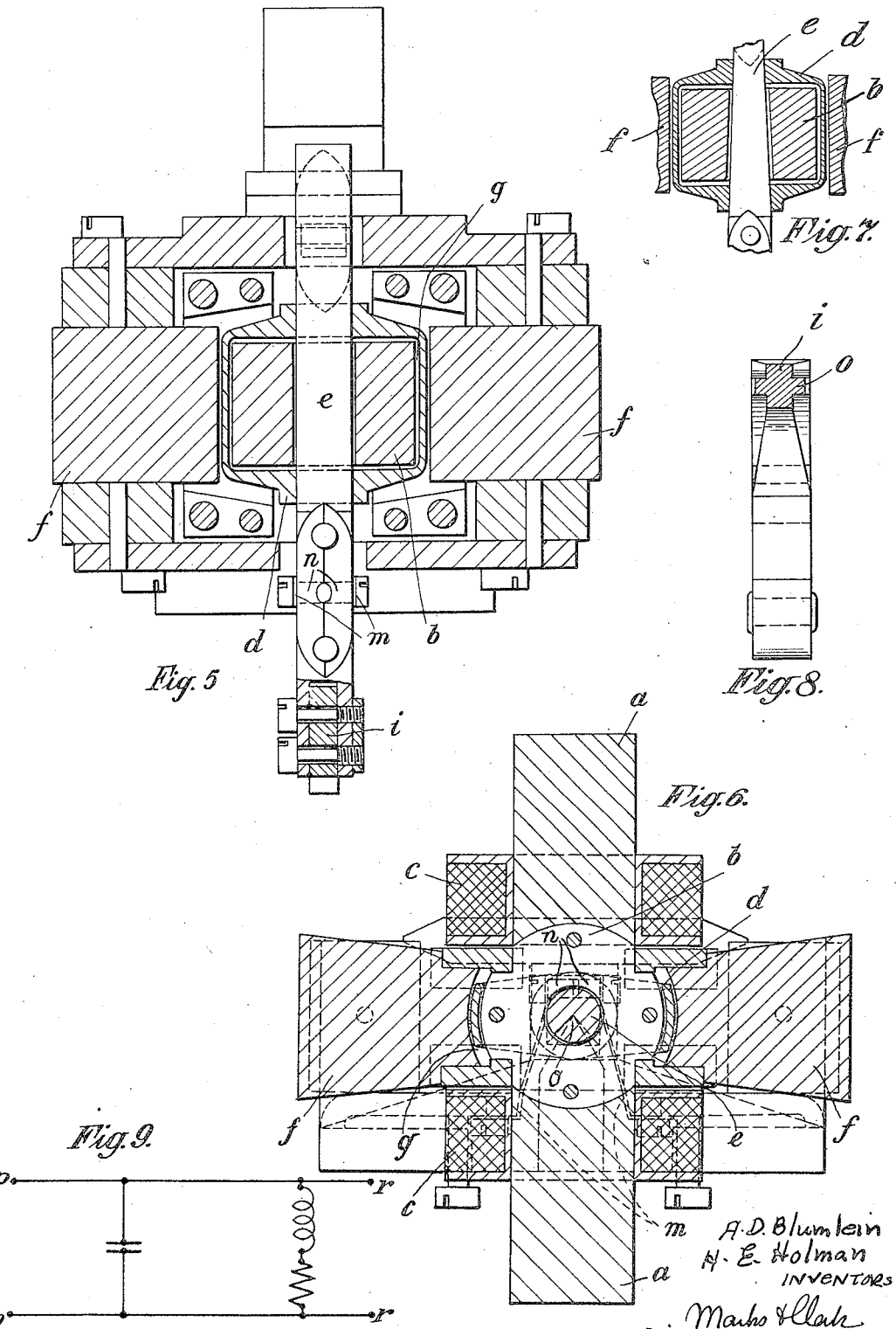

2,016,622

UNITED STATES PATENT OFFICE 2,016,622

MOVING COIL ELECTROMECHANICAL DEVICE

Alan Dower Blumlein, London, and Herbert Edward Holman, Clapham Common, London, England, assignors to Columbia Graphophone Company, Limited, London, England Original application February 26, 1931, Serial No. 518,524. Divided and this application September 8, 1931, Serial No. 561,755. In Great Britain March 10, 1930

12 Claims. (Cl. 179—100.41)

This invention relates to electro-mechanical apparatus more especially of the type in which a moving coil provides the energy necessary to operate other movable parts of the device. The invention is particularly directed to apparatus employed for the purpose of cutting upon a wax or like surface a record of sound or other impulses which it is desired subsequently to reproduce therefrom; and aims at improving the manner in which the coil and the operated member, such as a cutting stylus, are connected together, and their arrangement relative to the wax surface to be cut.

One object of the invention is to connect and mount the moving coil and stylus in such a manner that the coil (which forms the motor of the stylus) is well clear of the wax surface; and another object is to maintain desirable velocity relationship between the movements of the coil and the stylus.

The invention consists in a sound recorder in which the axis of rotation of the moving system is inclined or perpendicular to the wax surface.

The invention also consists in a moving coil sound recorder in which the cutting tool is connected to its driving motor by a linkage system comprising, or kinematically equivalent to, a shaft inclined or perpendicular to the wax surface and a stylus arm substantially perpendicular to the shaft.

The invention also consists in a moving coil sound recorder according to either of the two preceding paragraphs wherein the moving coil is damped by connection to an electrical circuit having a low impedance at frequencies close to resonance.

Further features of the invention will become apparent from the following description of a few modifications thereof, which will be more readily understood by reference to the accompanying drawings, wherein Figures 1, 2 and 3 represent diagrammatically various relative arrangements of moving coil and the stylus which it drives. For comparison Figures 2 and 3 represent possible arrangements in accordance with the present invention while Figure 1 represents an arrangement not incorporating the features of this invention.

Figures 4, 5 and 6 represent, in section, respectively side elevation, front elevation and plan of a sound recording device embodying the invention.

Figures 7, 8 and 9 represent parts of the arrangement of a sound recorder according to the invention showing details of construction and assembly.

Referring to Figures 1, 2 and 3, 1 represents the moving coil which may be either a former wound with wire, or may consist in a solid metal coil inductively coupled to speech windings which induce alternating driving currents within it. 2 represents a magnetic core supported within but clear of the moving coil. 3 and 4 represent pole pieces of the field system passing flux through the sides of the moving coil through the core 2. 5 (not shown in Figures 2 and 3) represents the yoke of the field system, and 6 the D. C. field windings. These field windings produce a steady flux across the gaps and thus cause movement of the moving coil due to the alternating currents flowing into the moving coil. 7 represents the stylus arm which for small movements converts the rotational movement of the moving coil 1 into substantially linear movement, by which the cutting stylus 14 is driven, and cuts the sound track in the wax surface 15. 8 (shown only in Figures 2 and 3) represents an axial extension shaft connecting the driving coil to the stylus arm 7. 9 represents a counterbalance weight to balance dynamically the mass of the stylus arm 7. 10 and 11 represent the bearings supporting the moving coil allowing it to rotate about an axis of symmetry. These bearings are shown in Figure 1 as point bearings supported by non-magnetic member 13 and 16. In Figures 2 and 3, the bearings consist preferably of knife edges supporting the shafts along lines indicated by 10 and 11 in the figures.

Referring to Figure 1 it will be seen that in order to couple the moving coil driving motor to the cutting stylus 14 it is necessary to provide an arm 7 of such a length that the cutting stylus 14 projects well below the underside of the recorder frame, so that ample clearance is obtained from the surface of the wax. It is a feature of moving coil drives, as compared with moving iron drives, that the moving coil is capable of executing relatively large rotational (or lateral) amplitudes and velocities, but possess a low mechanical impedance. Therefore, when a long arm such as 7 is used, it is possible to obtain very large displacements and velocities at the cutting tool 14, but the mechanical impedance presented to the wax by the cutting tool 14, will be very low. In effect, increasing the length of the arm 7 acts as though a mechanical transformer were inserted and an increased velocity step-up ratio provided. If the velocity of the cutter is doubled by means of increasing the length of the stylus arm 7, the impedance that the cutter presents to the wax surface will be quartered. Increasing the length of the stylus arm produces an increase of efficiency only so long as the increased mass of the stylus arm, introduced on account of its increased length, does not reduce the angular velocity of the moving coil for a given electrical input. Due to this mass inertia effect, it is usually impossible to increase the efficiency beyond a certain point by increasing the length of the stylus arm, since the advantages obtained on the account of increased efficiency by lengthening the stylus arm are partly discounted by disadvantages obtained due to the reduction of mechanical impedance. If this mechanical impedance is made too low, the impedance of the wax will easily affect the velocity of the cutting tool; small differences in the stiffness of the wax surface will materially affect the velocity of the cutting tool, and any irregularity in the wax surface will tend to move the cutting tool, and thus produce undesired noises in the finished record. It will be seen therefore, that there is an optimum length for the stylus arm for a given design of moving coil, this length being chosen to give the best possible efficiency consistent with a sufficiently high mechanical impedance. A reasonable design of moving coil drive usually entails an optimum length of stylus arm much shorter than that shown in Figure 1. Owing to the arrangement of the moving coil shown in Figure 1, it is impossible to work this recorder with a much shorter stylus arm than that shown, owing to the necessity of making the cutting stylus 14 project well below the lowest part of the recorder frame. According to the present invention the mounting of the moving coil and its coupling with the cutting tool are so arranged that the cutting tool projects well clear below the body of the recorder and the required relationships between cutting tool velocity and moving coil velocity may therefore be obtained.

In one modification according to the invention as shown in Figures 2 and 3, the moving coil drive has an extension shaft 8, extending along the rotational axis of the moving coil towards the surface of the wax. Fixed to the end of this shaft, remote from the moving coil and close to the wax, is the stylus arm 7, projecting substantially at right angles from the shaft 8. This stylus arm 7 carries the cutter or stylus 14 and, by varying the length of 7, the ratios of moving coil velocity and cutter velocity can be varied at will. It will be seen that in the case of the vertical axis of Figure 2 the clearance between the recorder body containing the moving coil drive and the wax is independent of the length of the stylus arm 7, and is determined by the length of the extension shaft 8. In Figure 3 the clearance between the recorder body and the wax is to a small extent determined by the length of the stylus arm 7, but this clearance can be increased or decreased at will by altering the length of the extension shaft 8, without altering the velocity ratio of the moving coil and cutting tool. Indefinite extension of the shaft 8 would of course introduce disadvantages due to the added inertia of the shaft and due to the resonance effects produced by torsional flexure of this shaft. Nevertheless, a reasonable separation between the moving coil drive with its associated frame, and the surface of the wax, can be obtained without introducing unreasonable inertia in the shaft 8 or serious resonances of this shaft.

A further feature of the invention consists in the introduction of a counterbalance weight, as shown at 9, in order to balance the mass of the stylus arm 7. In the form shown, this consists of a small lead rivet inserted in an arm extending in the opposite direction to the stylus arm. This counterbalance is so positioned as to make the combined centre of gravity of the stylus arm and counterbalance arm on the axis of the shaft 8, and it is also so positioned as to make one of the axes of the ellipsoid of inertia (or momental ellipsoid) of the stylus arm and counterbalance coincident with the axis of the shaft 8.

Further balance weights may be introduced so as to balance dynamically the whole motor assembly and to neutralize any unbalances in the structure due, say, to the arrangement of the knife edge supports. Similarly one balance weight may be adopted to balance the whole moving structure both by making the centre of gravity of the rotating parts lie on the axis of rotation (static balancing) and further by making one of the axes of the ellipsoid of inertia of the moving parts coincident with the pivotal axis (dynamic balancing).

The link work between the moving coil is essentially an axial extension shaft with an arm substantially at right angles to it or an arm so arranged that movement of the stylus is substantially equivalent to movement due to an arm at right angles to the shaft. Such coupling methods may be employed without the coupling arm following first a course along the axis and then a course at right angles to the axis; for instance, a single arm at an angle to the axis might be taken from close to the bearing 11 direct to the cutting tool 7, this arm being counterbalanced by a similar arm extending in the opposite direction from the axis. Other modifications of the line work are possible provided they are kinematically equivalent to a coupling means consisting of an extension shaft along the axis and a stylus arm at right angles.

In recording sound by means of an electromagnetic moving coil recorder according to this invention the recorder may conveniently take the form shown in Figures 4, 5 and 6. This apparatus comprises essentially an electrical transformer core $a$, preferably joined together by its ends to form a complete circuit for the permeating magnetic flux as shown, and preferably laminated to reduce reluctance, to a minimum, thickened at one point in its length to form a cylindrical bulbous portion $b$. Adjacent to and on opposite sides of this bulbous portion $b$ are wound the primary coils $c$ of the transformer, through which are passed varying audio-frequency electric currents dependent upon characteristics of the sound being recorded. Mounted to rotate about an axis substantially at right angles to the wax surface passing through the axis of the bulbous portion, and encircling it, is a rigid coil $d$ consisting of a single turn of material, such as aluminium, having small electrical resistance and low density. To obtain the required low resistance such a coil may be suitably cut from a solid block of the material. The coil $d$ may have a substantially rectangular shape, in which case the two sides parallel to the axes of rotation are cut as thin and narrow as possible (subject to the desired strength and resistance), while the other two sides may have increased width and thickness as they approach the axis of rotation. In this way the electrical resistance is reduced without materially increasing the moment of inertia of the coil. For the purpose of mounting the coil for rotation there may be, integral with it, shafts extending outside the coil along the desired axis. Alternatively, a separate single shaft $e$, as shown, may pass through suitable holes in the thickened portion of the coil, and through a clearance hole in the bulbous portion of the transformer core. This manner of mounting the coil is shown diagrammatically in Figure 7 representing in sectional front view a coil $g$ mounted by being forced upon a shaft $e$ which in the drawing has an exaggerated taper to make the arrangement clear. It will now be clear that variations in the audio-frequency currents passed through the primary windings $c$ of the transformer will induce corresponding currents in this rotatable coil $d$, which encloses the same core.

With their magnetic axes at right angles to the axis of the transformer core, and to the axis of rotation of the coil, are mounted, one on each side of the coil, the poles $f$ of a permanent or electromagnet (not shown in the drawings). These poles are shaped to form concave cylindrical surfaces corresponding with the convex cylindrical surfaces of the bulbous portion $b$ of the transformer core, and are mounted as near as is possible thereto, to reduce the air gap $g$ to a minimum possible for clearance of the coil $d$ the curved sides of which are movable in the curved air gap. The bulbous portion $b$ of the transformer core forms also a core between the magnetic poles $f$, thus assuring a strong and uniform field.

It will be seen that the superposition of this magnetic field on the coil $d$ in which audio-frequency currents are being induced will cause it to oscillate about its axis of rotation. To ensure that in rotation the coil does not contact with the core or magnet the pivoting shafts may be located by bearings, knife edges $o$ or elastic connections. Recesses are provided in the shaft $e$ as shown to receive the knife edges $o$ so that the line of contact between the shaft and knife edges lies along the shaft axis. Such bearings and support for the coil must be carefully insulated or suitably positioned so that no short circuited turn of low resistance is made round the audio-frequency A. C. flux path.

The shaft $e$ may be kept in contact with the knife edges and located vertically by means of springs $h$ attached to the shaft and passing through holes in the knife edge in which they may be clamped. The mean or neutral position of the coil may be located by springs $m$ (Figure 7) attached to screws $n$ on the shaft, which may be adjustable and serve to tune the mechanical resonance to any frequency desired.

The movements induced in the coil $d$ which forms the driving motor or shaft with its pivotal axis substantially perpendicular to the wax surface, are communicated to the cutting stylus $k$ by means of an extension of the stylus shaft $e$ which carries at its ends a stylus arm $i$. In the preferred construction shown, the stylus arm is clamped in a fork in the extended end of the shaft $e$. The stylus arm $i$ may be made of a magnesium alloy and the portion extending towards the cutting stylus $k$ is preferably of cruciform section so as to form a rigid non-resonant beam of small inertia. This sectioning of the stylus arm will be understood from Figure 4 and also from Figure 8 which represents a sectional view of the stylus arm assembly looking from below along the stylus arm axis. The arm $i$ tapers from the rotational axis but a side web $o$ is retained for strengthening purposes. The portion of the stylus arm $i$ extending away from the stylus $k$ serves to balance the stylus arm dynamically about the pivotal axis. This extension is much shorter and heavier than the extension to the stylus $k$ and carries a lead weight. By making this arm short and comparatively heavy it is possible to balance the stylus arm dynamically without unduly increasing its moment of inertia due to the balancing weight.

In the preferred construction shown, it is intended that thin cork packing be placed between the stylus shaft fork and the stylus arm $i$ so as to introduce damping for spurious oscillations, as described in U. S. A. patent application No. 553,902, filed July 29, 1931. This cork interleaving can be so arranged as to produce a resonance at very high frequencies and so modify the characteristic.

Unless mechanical or electrical damping of some type is introduced the mechanical impedance of this device will be very small at frequencies close to resonance; also, at these frequencies the response will be very large. In order to control the response and to provide a reasonably high mechanical impedance, so that the recorder is not unduly affected by irregularities, etc., in the wax, it is necessary to provide damping which will be effective at frequencies close to the resonant frequency of the moving parts and spring control, and with this in view electrical damping as described in U. S. A. patent application No. 518,524, filed Feb. 26, 1931, may be used, thus avoiding the difficulties associated with obtaining efficient mechanical damping. The natural resonance frequency of the recorder may be adjusted (by springs $m$ as described above), and the recorder shunted by an impedance network so chosen that, at that frequency, the shunt impedance is small compared with the impedance of the recorder, in order that the resonance peak of the recorder is reduced to a normal value; while at other frequencies (particularly at very high frequencies) it will be of a value comparable with that of the recorder, which will therefore be operated more effectively. The simplest form of such damping is represented in Figure 9 showing in shunt across the leads to the recorder a capacity in parallel with a series inductance and resistance. Current from the amplifier is led to the terminals $p$, $p$, and taken by the coils $c$ of the recorder from terminals $r$, $r$. The inductance has a value such that its reactance at the resonant frequency of the recorder is low compared with the resistance of the recorder. Similarly, the value of the resistance is also low compared with the recorder resistance. Thus, at the resonance of the recorder it is shunted by a circuit of low impedance and so obtains electromagnetic damping. The condenser serves to resonate the inductance at the highest frequency at which it is desired to record in order to obtain good efficiency where the response of the recorder is a minimum. More complicated circuits with the same object may be employed and details of such arrangements will be found in the specification of copending U. S. application No. 518,524 above referred to.

Alternatively by suitably adjusting the thickness and masses of the members of the moving system it is possible to introduce additional resonances to modify the response characteristics.

Thus, for example, the compliance of the pivotal and extension shafts e, or the inertia of the stylus arm i, may be adjusted to give a high frequency resonance, which would then serve to modify the high frequency portion of the response curve. This resonance may conveniently be controlled by varying the length and construction of the extension shaft.

From the above description it will be clear that many modifications of the recording device are possible and it must be understood that the description is given only by way of example and must not be considered as having any limiting effect.

Having now decribed our invention, what we claim as new and desire to secure by Letters Patent is:—

1. A sound recorder comprising a moving coil, means for inducing currents in said coil from an external source operated by the sounds to be recorded, and a wax-cutting tool connected to said coil by a shaft extending downwards towards the wax surface and a stylus arm of cruciform cross-section extending laterally from said shaft.

2. A sound recorder comprising a pivotal shaft upon which is separately mounted a substantially rectangular coil the sides of which increase in section as they approach the said shaft, a core within said coil provided with an aperture through which said shaft passes, a wax-cutting tool attached to said shaft by a stylus arm extending laterally therefrom, and means for inducing electric impulses in said coil, corresponding to the sounds to be recorded, whereby the said cutting tool is driven.

3. A sound recorder according to claim 2 wherein the said shaft is tapered and fits into tapered holes in the sides of the coil, whereby the coil is located in position and firmly secured.

4. A sound recorder according to claim 2 wherein the core immediately within the coil comprises a bulbous cylindrical portion separately removable from the remainder of the magnetic circuit of which it forms a part.

5. A sound recorder according to claim 2 wherein the core within the moving coil is built of laminations perpendicular to the pivotal axis of the coil.

6. A sound recorder comprising a moving coil fast to a pivotal shaft, knife-edges for supporting said system and suitable seats cut in said pivotal shaft for receiving said knife-edges, a wax-cutting tool secured to said shaft by a stylus arm extending laterally therefrom, and means for inducing in said coil electric impulses corresponding with the sounds to be recorded, whereby the cutting tool is driven.

7. A sound recorder according to claim 6 wherein the knife-edge seatings are sunk into the said shaft so that they contact with the shaft on the axis of the system.

8. A sound recorder according to claim 6 wherein the pivotal shaft is held against the said knife-edges by spring means associated therewith.

9. A sound recorder according to claim 6 provided with spring means whereby the mean or neutral position of the coil is determined.

10. A sound recorder according to claim 6 wherein for locating the mean or neutral position of the said coil a light leaf spring is provided suitably attached, e. g. by screws, to the pivotal shaft and to supporting framework.

11. A sound recorder comprising a shaft extending towards the recording surface, an electric coil connected to said shaft, a magnet with poles adapted to envelop said coil in a magnetic field, and pivotal means, adapted to support said shaft in said magnetic field, which are so positioned that the shaft intercepts the magnetic circuit only in the space between the magnet poles.

12. A sound recorder according to claim 11 comprising a stylus arm on one end of said shaft and a magnetic circuit extending over and above the other end of the shaft, said supporting pivots being on opposite sides of the magnet poles which provide the magnetic field enveloping said coil.

ALAN DOWER BLUMLEIN.
HERBERT EDWARD HOLMAN.